United States Patent [19]

White

[11] Patent Number: 4,527,054
[45] Date of Patent: Jul. 2, 1985

[54] OPTICAL FIBER SENSING DEVICE FOR HYDRAULIC MOTORS

[76] Inventor: Harvey C. White, 3733 Capilano, West Lafayette, Ind. 47906

[21] Appl. No.: 387,249

[22] Filed: Jun. 10, 1982

[51] Int. Cl.³ ............................................. G02B 5/14
[52] U.S. Cl. ...................................... 250/227; 417/63
[58] Field of Search ......................... 250/227, 231 SE; 324/175; 350/96.24, 96.25, 96.26, 96.27; 417/63

[56] References Cited

U.S. PATENT DOCUMENTS 4,162,399  7/1979  Hudson ............................. 250/227 X
4,387,299  6/1983  Akiyama ....................... 250/231 SE Primary Examiner—David C. Nelms

[57] ABSTRACT

An optical sensing device, for determining the rotational speed and other parameters of a hydraulic motor, is disclosed. One or more fiber optic cables are led into the interior of the motor, with their ends located where they may be successively covered and uncovered by the moving members of the motor. Each cable contains at least two light paths, isolated so that light can pass from one path into the other only by being reflected from an oil-filled space at the end of the cable. A light input is provided to one path of each cable, and continuity of light is recorded and timed at the other path as an output.

6 Claims, 4 Drawing Figures

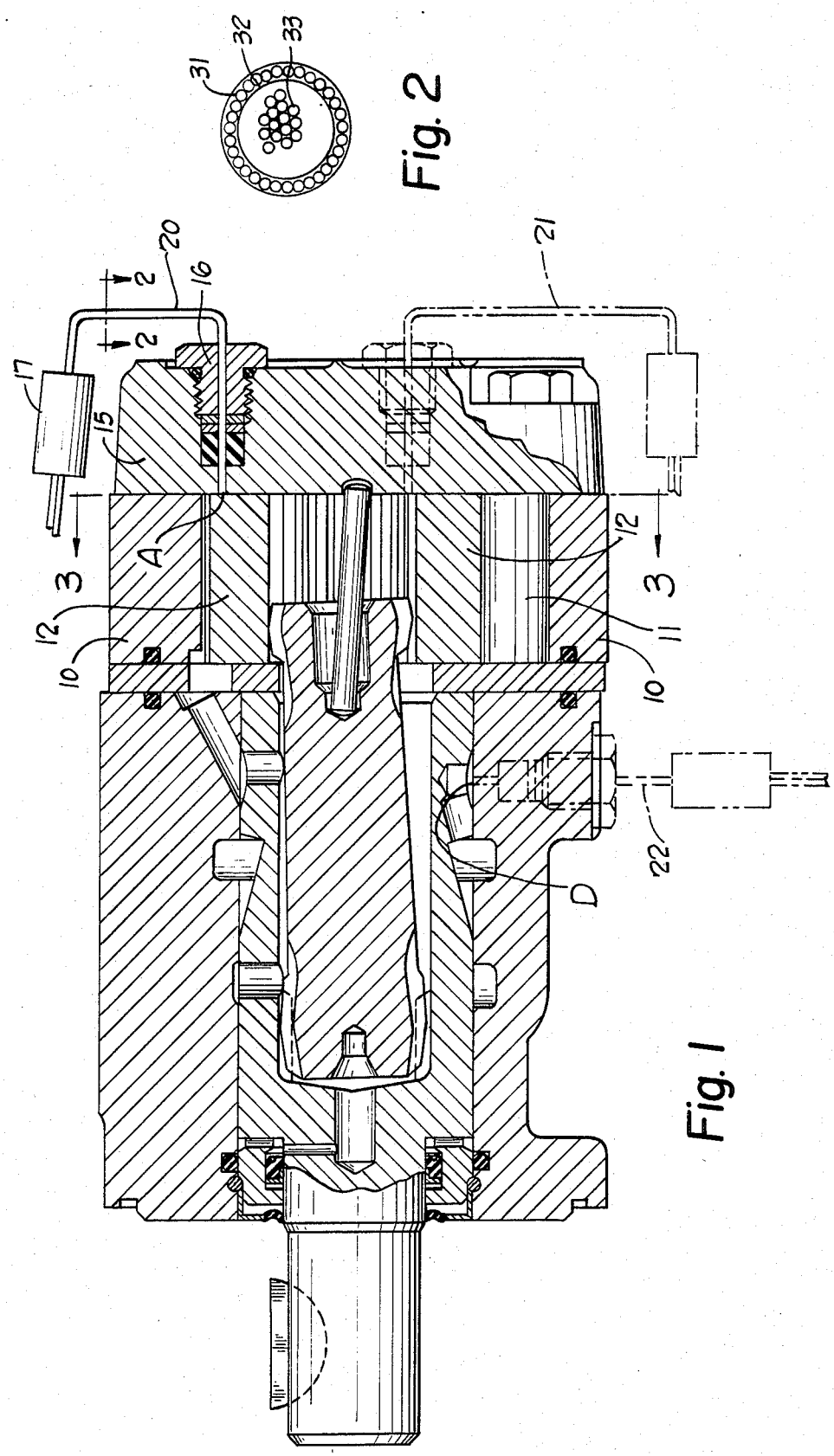

OPTICAL FIBER SENSING DEVICE FOR HYDRAULIC MOTORS

This invention relates to sensing devices, and in particular to optical apparatus for detecting the velocity and/or position of the output moving member of a hydraulic motor such as a gerotor pump-motor.

In various applications for which gerotors are used, it has been proven desirable to know to a close degree of tolerance, at any given time, the rotational velocity and/or the position of the rotor. For example, the speed of a grain harvesting combine reel needs to be collated with the ground speed. When a gerotor motor drives the reel, a means is needed to inform the supply pump how much fluid to pump to collate with the ground speed. The operator can on some models adjust to the ground speed via input to a control valve. But this method, depending upon the constant attention and skill of the operator, often results in wasted grain.

My invention is an optical means for sensing the function of the gerotor rotor inside the stator. It comprises one or more fiber optic cables leading into the gerotor housing and having their ends coincident with the back face of the gerotor cavity, or with the inner surface of the output shaft housing. The cables transmit light from an external source, through fibers located on their outsides, into the gerotor housing. When the light emerging from the outside or rim fibers meet a reflective medium such as oil in the rotor cavity, it is transmitted to fibers in the core of the cable and thence out to a sensing device, which gives an "on" response. However, at any time when the end of the fiber optic cable is covered by the rotor in the course of its travel, the light emerging from the outside or rim fibers is not reflected back into the core fibers, and the sensing device at the core fiber output reveals this fact with an "off" reading.

By an appropriate placement of the fiber optic cable or cables in the face of the gerotor cavity, and by accurate timing of the "on"-"off" periods, great precision can be achieved in the determination of the rotor velocity or position. This determination may be employed in various ways to control the function of other apparatus, or it may be fed back to the gerotor itself. For example, in the grain harvester described above, the gerotor speed information may be correlated wih the ground speed, derived from the wheels, with the aid of a microprocessor. The comparison output may then be used to control the supply pump to the gerotor.

According, it is an object of my invention to provide a means of determining the velocity and position of a gerotor rotor with great accuracy.

A further object of my invention is to provide such a means which accomplishes its function optically.

These and other objects can be seen by referring to the following description and claims, taken in conjunction with the accompanying drawings in which:

FIG. 1 is a cross section of a typical gerotor equipped with the sensing device of my invention, shown in alternative locations in phantom;

FIG. 2 is a cross-section of the fiber optic cable used in my invention, taken through line 2—2 of FIG. 1;

Figure 4:
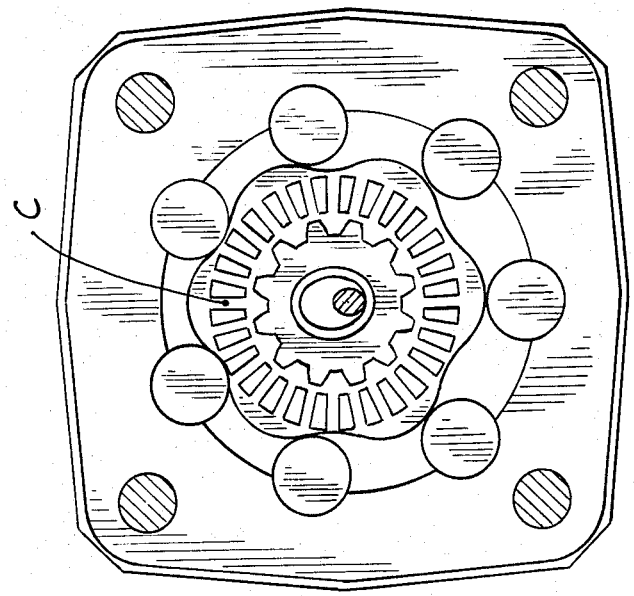
FIG. 4 is the same cross-section where the rotor is provided with slots in its rear face.

FIG. 1 shows a typical gerotor with stator 10, rollers 11, and a rotor 12 inside the stator cavity. Optical fiber cable 20 passes into the end plate 15 of the gerotor by means of mounting bushings 16 of any convenient construction. The ends of the optical fiber cables 20 and 21 coincide at point 40 with the back face of the cavity. Alternative locations for fiber cables 21 and 22 are shown in phantom.

The optical fiber cables contains two groups of fibers. The outside or rim fibers 31 are separated by an opaque layer 32 from the inside or core fibers 33, as seen in FIG. 2. A light source is provided to the rim fibers, which transmit the light into the gerotor. If the end of the fiber is covered by the rotor, as at A, the light cannot pass into the core fibers. If it is not covered, then the light is reflected from the oil in the cavity and enters the core fibers, whence it is transmitted to an external sensing device provided with a timer and microprocessor. This device, shown schematically as box 17 in FIG. 1, may also conveniently incorporate the light source for the rim fibers 31. It will be seen that the light could as well be provided to the core fibers, the direction of its travel reversed, and the light sensed from the rim fibers.

In practice it is convenient to use a fiber optic scanner such as that manufactured by Skan-a-Matic R Corporation and called the Nano-skan R Fiber Optic Skanner, S2005-3 series. These scanners contain a light source (lamp or LED), cable with semi-rigid snout, and phototransistor sensor.

Figure 3:
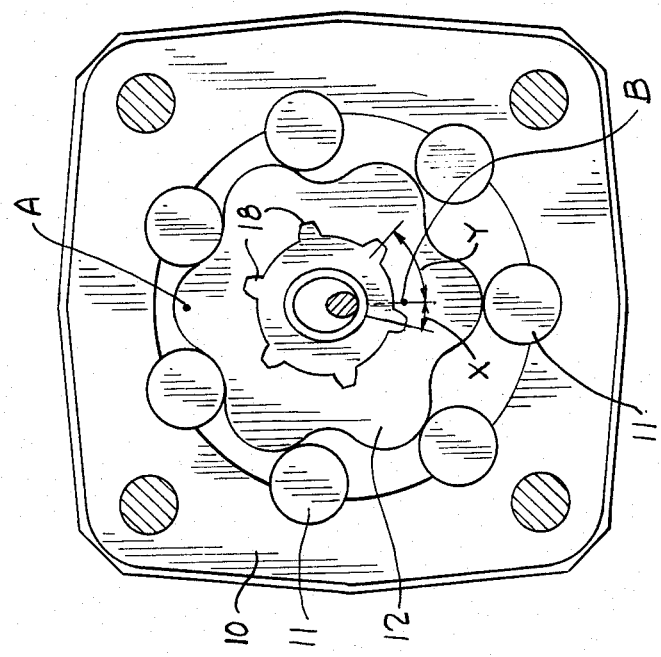
FIG. 3 is a cross-section taken through the line 3—3 of FIG. 1 showing the stator and rotor as seen from the back face of the rotor cavity.

Referring to FIG. 3, since the end of the cable is located at point A, the light path will be interrupted when the rotor 12 is at the position shown, since it then covers the end of the cable. However, as the rotor orbits inside the cavity, the end of the cable becomes uncovered, and the light path is completed. When the rotor completes its orbit the light path is again interrupted. In this manner, by timing the "on-off" cycles of light at the cable output, the revolutions per minute of the rotor can be read directly.

If desired, another cable may be inserted in the end plate 15 of the gerotor, with its end located at point B of FIG. 3. If the ID splines 18 are not symmetrically placed with respect to the rotor lobes, that is, if the distances x and y of FIG. 3 are not approximately equal, then the relationship of the on-off patterns derived from point A to those derived from point B will depend on the direction of rotation of the rotor. For one direction, the light path is closed at A before it is at B, conversely for the other direction. By comparing the two patterns, preferably with the aid of a microprocessor, the direction of rotation can be determined.

Another embodiment of my invention is seen in FIG. 4. In this application, the rotor has been slotted on its rear face where it abuts the end plate. With the end of the cable at point C, there will be many breaks in the continuity of the transmitted light with each orbit of the rotor. This permits a high degree of resolution to be attained.

Yet another embodiment of my invention is shown in phantom in FIG. 1. The cable 22 is led into the housing of the gerotor's output shaft. That shaft typically has in its outer wall various apertures, called commutator slots and commutator holes, for the passage of fluids. With the end of the cable at point D over which some or all of these apertures pass during shaft rotation, the position of the shaft and its rotational velocity can be determined.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a gerotor, said gerotor having a cavity with a cavity wall and containing a reflective fluid, said gerotor also having a moving part contained within said cavity which moving part describes a path within said cavity during the operation of said gerotor, said moving part having a non-reflective surface and said cavity wall containing a sensing point which is covered by said non-reflective surface of said moving part during a first part of said path of said moving part but which is covered only by said reflective fluid during a second part of said path of said moving part, a sensing device comprising optical fiber transmission means having a first and a second light path, said first and second light paths being isolated from each other such that light cannot pass from either path to the other inside said transmission means;

said first and second light paths having first and second ends, respectively, at said sensing point in said cavity wall, said ends being adapted, with respect to said two light paths, such that when said moving part is describing the first said part of its said path, thereby covering said sensing point with its said non-reflective surface, light cannot pass from said first to said second light path, but when said moving part is describing the second said part of its said path, thereby permitting said sensing point to be covered only by said reflective fluid, light may pass from said first to said second light path;

a light source associated with said first light path, whereby light is provided to said first light path; and means for sensing, at any point in time, whether said light is passing to said second light path, and thus for determining periods of time during which said light has passed to said second light path.

2. The sensing device of claim 1 and further comprising means for timing said periods of time during which said light has passed to said second light path.

3. The sensing device of claim 1, and wherein said moving part is a rotor of the said gerotor, said cavity is a rotor cavity and said cavity wall is a back face of said rotor cavity.

4. The sensing device of claim 3 and in which said rotor has a rear face interrupted by slots therein, and said non-reflective surface of said rotor comprises the areas of said rear face between said slots.

5. The sensing device of claim 1, and wherein said moving part is an apertured output shaft of the said gerotor, said cavity is a housing for said output shaft and said cavity wall is an inner wall of said shaft housing.

6. The sensing device of claim 1 and in which said first and second light paths are contained in a single cable, and said first and second ends are located at an end of said cable.

* * * * *